United States Patent
Piech et al.

(10) Patent No.: US 9,457,994 B2
(45) Date of Patent: Oct. 4, 2016

(54) METHOD OF ASSEMBLING AN ELEVATOR MACHINE FRAME

(71) Applicant: OTIS ELEVATOR COMPANY, Farmington, CT (US)

(72) Inventors: Zbigniew Piech, Cheshire, CT (US); Stephen R. Nichols, Unionville, CT (US); Patricia L. Driesch, Manchester, CT (US); Pawel Witczak, Lodz (PL); Benjamin J. Watson, Berlin, CT (US)

(73) Assignee: Otis Elevator Company, Farmington, CT (US)

( * ) Notice: Subject to any disclaimer, the term of this patent is extended or adjusted under 35 U.S.C. 154(b) by 190 days.

(21) Appl. No.: 14/108,416

(22) Filed: Dec. 17, 2013

(65) Prior Publication Data

US 2014/0101916 A1  Apr. 17, 2014

Related U.S. Application Data

(62) Division of application No. 12/742,489, filed on May 12, 2010, now Pat. No. 8,631,907.

(51) Int. Cl.
| | |
|---|---|
| *B66B 11/04* | (2006.01) |
| *B66D 3/20* | (2006.01) |
| *H02K 7/10* | (2006.01) |
| *H02K 5/24* | (2006.01) |
| *H02K 7/102* | (2006.01) |

(52) U.S. Cl.
CPC ............ *B66B 11/0438* (2013.01); *B66D 3/20* (2013.01); *H02K 5/24* (2013.01); *H02K 7/1004* (2013.01); *H02K 7/1021* (2013.01); *Y10T 29/49826* (2015.01)

(58) Field of Classification Search
CPC ... B66B 11/043; B66B 11/0438; B66D 3/20; H02K 7/1008
See application file for complete search history.

(56) References Cited

U.S. PATENT DOCUMENTS

| | | | | |
|---|---|---|---|---|
| 140,786 | A | 7/1873 | Mellen | |
| 2,391,580 | A | 12/1945 | Mackmann | |
| 2,891,767 | A * | 6/1959 | Armington, Jr. | B66D 3/22 188/134 |
| 3,107,899 | A * | 10/1963 | Henneman | B66D 1/14 192/17 A |
| 3,853,303 | A * | 12/1974 | Wineburner | B66D 1/14 254/345 |

(Continued)

FOREIGN PATENT DOCUMENTS

| | | |
|---|---|---|
| EP | 1698581 A1 | 9/2006 |
| JP | 61273487 | 12/1986 |

(Continued)

OTHER PUBLICATIONS

International Search Report and Written Opinion of the International Searching Authority for International application No. PCT/US2007/086905 mailed Nov. 18, 2008.

(Continued)

*Primary Examiner* — Minh Truong
(74) *Attorney, Agent, or Firm* — Carlson, Gaskey & Olds

(57) ABSTRACT

An exemplary method of assembling an elevator machine frame includes situating at least a portion of a motor in a desired position, placing an elevator frame support plate against the portion of the motor, connecting a plurality of support rods to the support plate and connecting another support plate to the support rods such that the support plates are spaced from each other and in a desired alignment with each other.

6 Claims, 4 Drawing Sheets

(56) References Cited

U.S. PATENT DOCUMENTS

| | | | |
|---|---|---|---|
| 4,004,780 A | 1/1977 | Kuzarov | |
| 4,019,717 A * | 4/1977 | Freiburger | B66D 1/28 |
| | | | 254/345 |
| 4,461,460 A * | 7/1984 | Telford | B66D 1/22 |
| | | | 188/337 |
| 4,545,567 A | 10/1985 | Telford et al. | |
| 4,736,929 A * | 4/1988 | McMorris | B66D 1/22 |
| | | | 254/323 |
| 5,502,342 A | 3/1996 | Feldkamp | |
| 6,144,130 A | 11/2000 | Kawamura | |
| 6,371,248 B1 | 4/2002 | Cholinski | |
| 6,601,828 B2 | 8/2003 | Strbuncelj et al. | |
| 6,631,886 B1 | 10/2003 | Caudle et al. | |
| 6,663,086 B2 | 12/2003 | Huang | |
| 7,111,522 B2 | 9/2006 | Wingett et al. | |
| 7,398,855 B2 | 7/2008 | Seel | |
| 7,422,089 B2 | 9/2008 | Ammon et al. | |
| 7,614,609 B1 * | 11/2009 | Yang | B66D 1/22 |
| | | | 254/344 |
| 8,631,907 B2 * | 1/2014 | Piech | B66B 11/0438 |
| | | | 187/254 |
| 2002/0100902 A1 * | 8/2002 | Strbuncelj | B66B 11/043 |
| | | | 254/266 |
| 2004/0188183 A1 | 9/2004 | Kato | |
| 2005/0173866 A1 | 8/2005 | Sayers | |
| 2005/0206257 A1 | 9/2005 | Takagi et al. | |
| 2006/0151251 A1 * | 7/2006 | Rennetaud | B66B 11/0438 |
| | | | 187/254 |
| 2007/0052308 A1 | 3/2007 | Coupart | |

FOREIGN PATENT DOCUMENTS

| | | |
|---|---|---|
| JP | 6413392 | 1/1989 |
| JP | 8201715 A | 8/1996 |
| JP | 200318946 A | 11/2000 |
| JP | 2007001714 | 1/2007 |
| WO | 9832684 | 7/1998 |
| WO | 02103883 A1 | 12/2002 |

OTHER PUBLICATIONS

International Preliminary Report on Patentability for International application No. PCT/US2007/086905 mailed Jun. 24, 2010.

* cited by examiner

US 9,457,994 B2

METHOD OF ASSEMBLING AN ELEVATOR MACHINE FRAME

CROSS-REFERENCE TO RELATED APPLICATION

This is a divisional application of U.S. patent application Ser. No. 12/742,489 dated May 12, 2010.

BACKGROUND

Elevator systems typically include a machine assembly for moving the elevator car in a desired manner within a hoistway. Some elevator systems include a hydraulic arrangement for moving the elevator car. Other elevator systems are traction-based and utilize a roping arrangement (e.g., round ropes or flat belts) for suspending the elevator car and a counterweight. Movement of a traction sheave is controlled by a machine including a motor, drive and brake. There are known techniques for controlling the movement and position of an elevator car and counterweight in a traction-based elevator system.

For many years elevator machines were located in a machine room outside of the elevator hoistway. Typical arrangements included a machine room on the roof of a building. More recently, machine roomless elevator systems have been introduced. In such systems, the elevator drive is positioned within the hoistway because there is no longer a machine room. While such arrangements provide for economic advantages, they introduce new challenges to designers of elevator systems.

One challenge presented to elevator designers is how to support the elevator machine within the hoistway. One proposal is shown in the Published U.S. Application No. 2006/042882.

Another example challenge stems from placing the elevator machine within the hoistway because that introduces an additional source of noise within the hoistway. Noisy elevator systems tend to be undesirable because passengers may become annoyed or uncomfortable when hearing noises during elevator operation. It is desirable to minimize the amount of noise within a hoistway that is the result of the elevator machine operation.

SUMMARY

An exemplary method of assembling an elevator machine frame includes situating at least a portion of a motor in a desired position, placing an elevator frame support plate against the portion of the motor, connecting a plurality of support rods to the support plate and connecting another support plate to the support rods such that the support plates are spaced from each other and in a desired alignment with each other.

In a further non-limiting embodiment of the foregoing method, the method includes securing a bearing housing to each of the support plates.

In a further non-limiting embodiment of either of the foregoing methods, the method includes inserting a traction sheave and an associated motor component through an opening in the second support plate and at least a portion of the associated motor component through a corresponding opening in the first support plate.

The various features and advantages of the disclosed examples will become apparent to those skilled in the art from the following detailed description. The drawings that accompany the detailed description can be briefly described as follows.

DETAILED DESCRIPTION

A disclosed example elevator machine frame assembly includes unique features that reduce an amount of noise associated with operation of a corresponding elevator machine.

Figure 1:
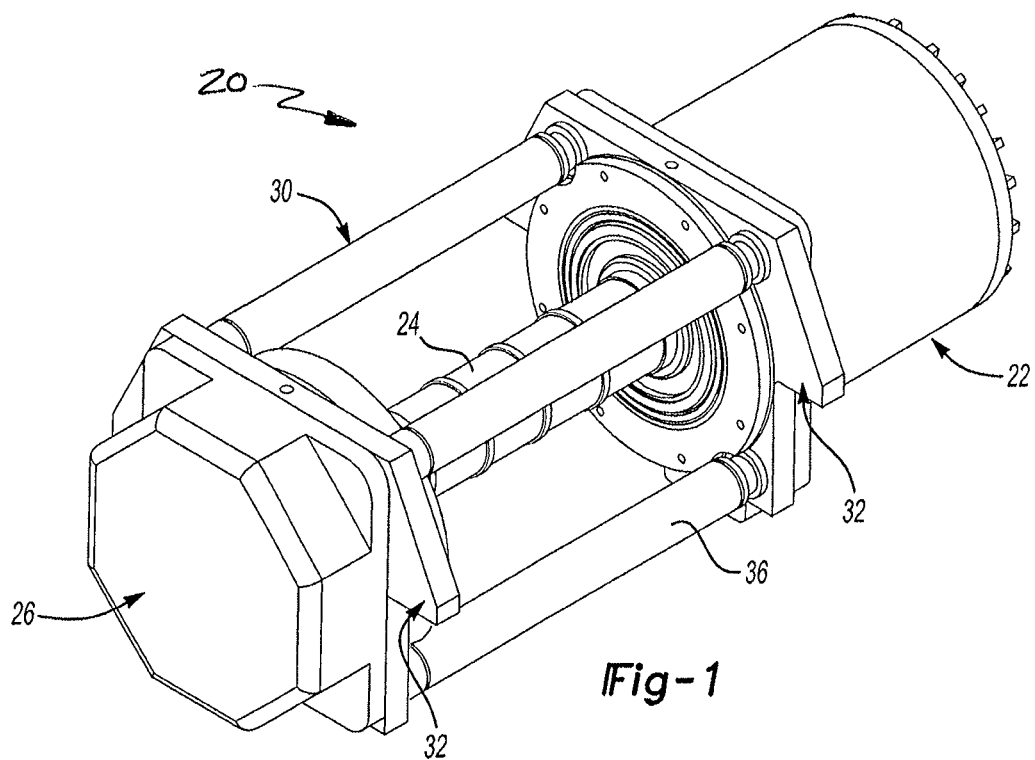
FIG. 1 diagrammatically illustrates an example elevator machine frame assembly designed according to an embodiment of this invention.

FIG. 1 schematically shows an example elevator machine assembly 20 that includes a motor 22, a traction sheave 24 and a brake portion 26. The motor portion 22 causes desired movement of the traction sheave 24 that results in associated movement of an elevator load bearing assembly (e.g., a roping arrangement comprising flat belts or round ropes) and associated movement of an elevator car. The brake assembly 26 applies a braking force to slow down movement of the traction sheave or to prevent it from moving when an elevator car is stationary at a landing, for example. The motor portion 22 and the brake portion 26 operate in a known manner.

The motor portion 22, traction sheave 24 and brake portion 26 in the illustrated example are all supported by an elevator machine frame 30. As can be appreciated from FIGS. 1 and 2, the example frame 30 includes a plurality of support plates 32 that are configured to support portions of the elevator machine. Some example support plates are cast iron and others comprise steel. In this example, bearing housings 34 are supported by each of the support plates 32. The bearing housings 34 accommodate bearings that facilitate rotation of the traction sheave 24, for example.

A plurality of support rods 36 are connected to the support plates 32 near ends 38 of the support rods. The support rods 36 maintain a desired spacing between the support plates 32 and a desired alignment of the support plates 32. In this example, the support plates 32 each include a plurality of recesses or counter sunk holes 40 associated with openings through which a portion of the support rods 36 are received. In the illustrated example, fastening members 42 secure the support plates 32 relative to the support rods 36. The illustrated fastening members 42 comprise threaded nuts that are received over threaded portions of the ends 38 of the example support rods 36. Another example includes welded connections between support rods and support plates. In another example, the support rods and the support plates are part of a single casting.

While the illustrated example includes four support rods 36, it is possible to use fewer support rods or more, depending the needs of a particular situation. One example includes two support rods 36. Given this description, those skilled in the art will be able to select an appropriate number of support rods and to configure the corresponding support plates accordingly to meet the needs of their particular situation.

Figure 2:
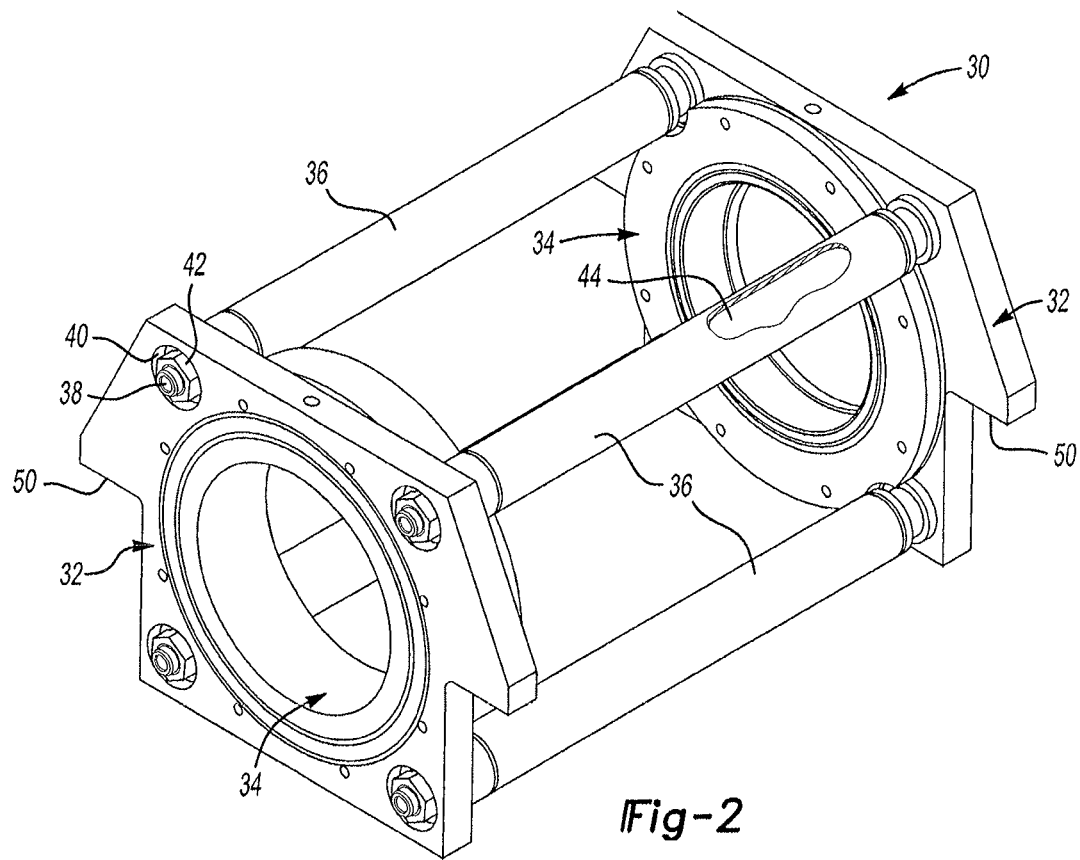
FIG. 2 is a perspective view of selected portions of the example of FIG. 1.

As can be appreciated from FIG. 2, each of the support rods 36 comprises an outer shell that is filled with a sound-dampening material 44 along at least a portion of the length of each support rod 36. In one example, approximately ¾ of the length of each support rod 36 is filled with the sound-dampening material 44. In one example, the exterior surface of the outer shell of the support rods comprises at least one of steel or iron. In one example, the sound-dampening material 44 comprises at least one of sand or foam. Including the sound-dampening material 44 within the support rods 36 provides a noise-reducing feature of the example frame 30. The sound-dampening material 44 reduces noises otherwise associated with vibrations of the machine during operation.

Another noise reducing feature of the example frame 30 includes an arrangement of mounting surfaces 50 of the support plates 32. As can be appreciated from FIG. 3, mounting surfaces 50 are associated with oppositely facing sides of each support plate 32. The mounting surfaces 50 are configured to be received upon a corresponding structural member 52 within a hoistway, for example.

The example mounting surfaces 50 are aligned with each other within a plane 54. In the illustrated example, all four mounting surfaces 50 (e.g., two mounting surfaces 50 per plate 32) are coplanar with each other. The plane 54 including the mounting surfaces 50 intersects an axis of rotation 56 of the traction sheave 24 when the traction sheave 24 is appropriately supported by the machine 32. In this example, the axis of rotation 56 coincides with a centerline of the traction sheave 24, which coincides with a centerline of an opening 57 that accommodates a bearing housing 34.

Positioning the mounting surfaces 50 within the plane 54, which intersects with the axis of rotation 56, provides a noise-reducing feature of the example frame 30. Arranging the mounting surfaces 50 as shown in the illustrated example reduces torsional vibration modes of the elevator machine assembly 20. In one example, a noise reduction factor on the order of 2.5 dB is achieved by using the example mounting surface arrangements.

Figure 3:
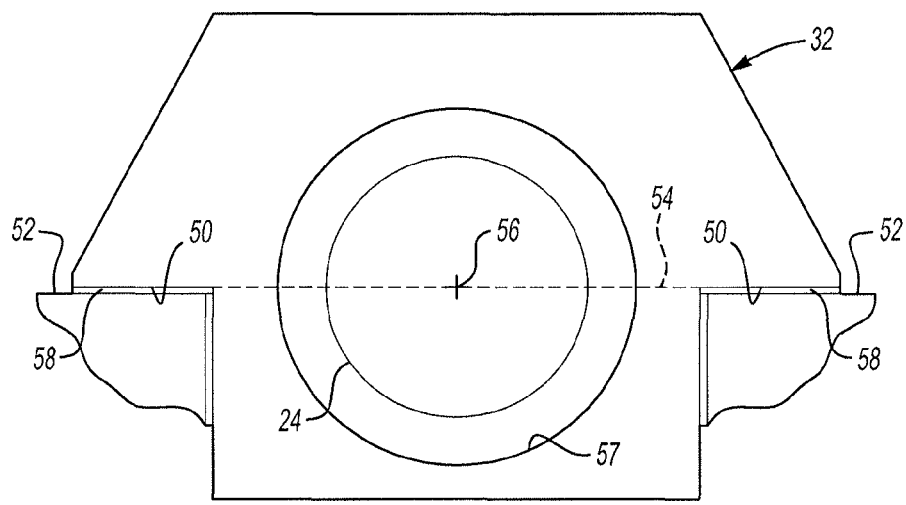
FIG. 3 is an end view showing selected portions of the example of FIG. 1.

The example of FIG. 3 includes an additional noise-reducing feature. In this example, isolation pads 58 are associated with each of the mounting surfaces 50. The isolation pads 58 comprise a compliant material that is softer than the metal material used for making the support plates 32. Example materials useful as the isolation pads 58 comprise natural or synthetic rubber. Other elastomeric materials that are compliant and useful for enhancing dampening of vibrational energy are useful, also. The softer material of the isolation pads 58 reduces vibration and noise transmission between the support plates 32 and the structural members 52. In one example, the isolation pads 58 are secured to the mounting surfaces 50. In another example, the isolation pads 58 are formed as part of the support plates 32 such that they are an integrated part of the support plates 32.

In the illustrated example, the mounting surfaces 50 are on flanges that protrude from oppositely facing plate edges. In this example, an entirety of each plate 32 including the flanges and the mounting surfaces 50 is formed as a single piece of material. One example includes casting or shaping a metal to achieve a single-piece, monolithic structure for each of the support plates 32.

Figure 4:
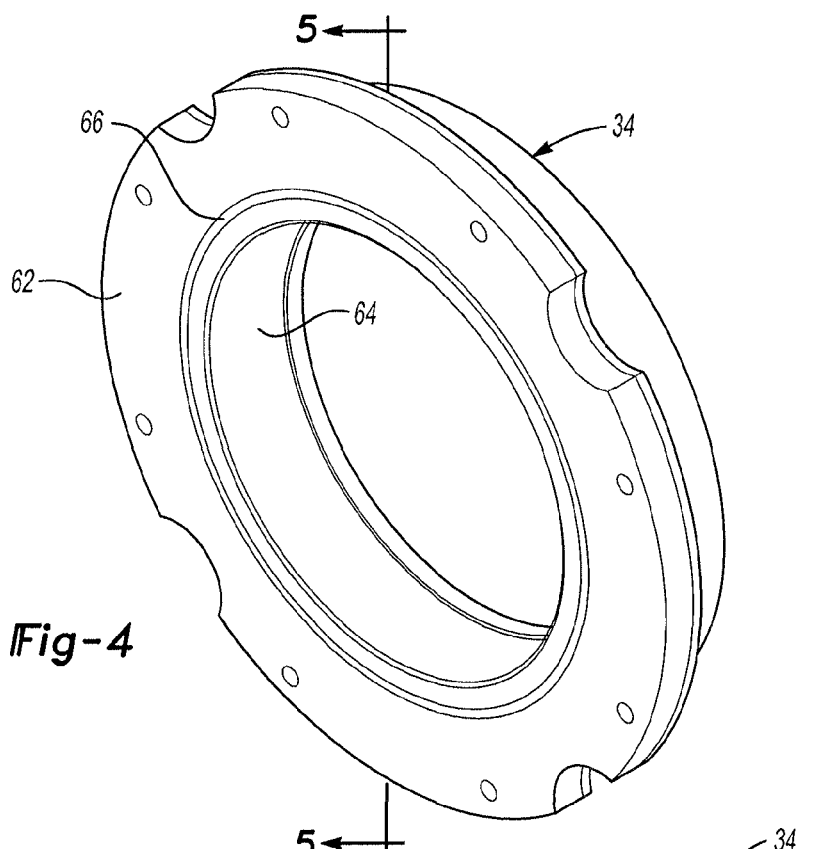
FIG. 4 is a perspective illustration of an example bearing assembly used in one example embodiment.
Figure 5:
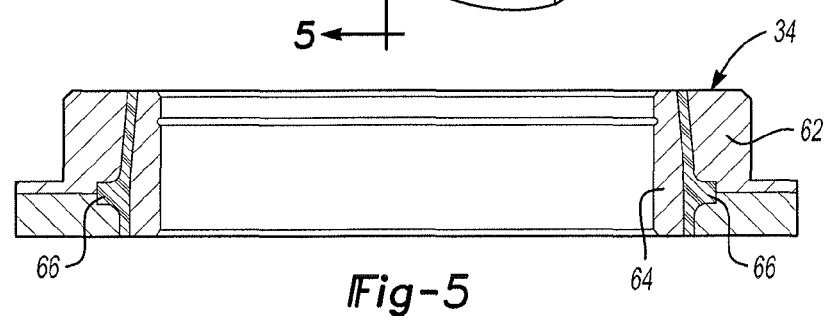
FIG. 5 is a cross-sectional illustration taken along the lines 5-5 in FIG. 4.

Referring to FIGS. 4 and 5, an example bearing housing 34 includes an outer ring portion 62 and an inner ring portion 64. An insert 66 is positioned between the outer ring portion 62 and the inner ring portion 64. The insert 66 in this example is made from a different material than that used for the outer ring portion 62 and inner ring portion 64. The insert 66 has a noise-reducing or noise dampening coefficient. One example includes poly-paraphenylene terephthalamide (e.g., KEVLAR™).

The bearing housings 34 provide a noise-reducing effect by being an intermediate component between the support plates 32 and the bearings used for facilitating rotational movement of the traction sheave 24, for example. If the bearings were situated directly against the support plates 32, there would be additional vibration and, therefore, additional noise. The bearing housings 34 facilitate reducing such vibration and associated noise generation.

The insert 66 further reduces noise because it comprises a noise-reducing material to provide additional damping effects resulting in less noise.

Any one of the noise-reducing features of the example frame 30 could be used alone to achieve a lower-noise elevator machine arrangement. A combination of two or more of them will provide enhanced noise-reduction in many examples. Given this description, those skilled in the art will be able to select one or all of the noise-reducing features of the illustrated example to achieve a desired amount of noise control for their particular situation.

Figure 6:
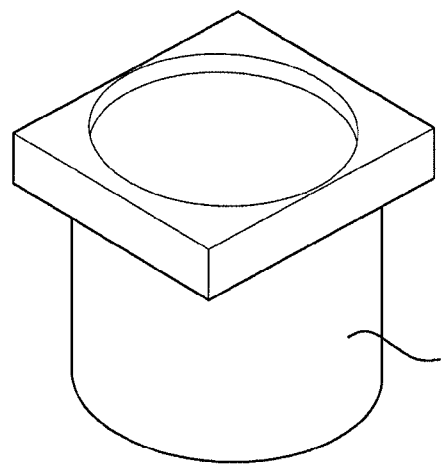
FIG. 6 schematically illustrates a portion of an example process of assembling an elevator machine frame arrangement.
Figure 7:
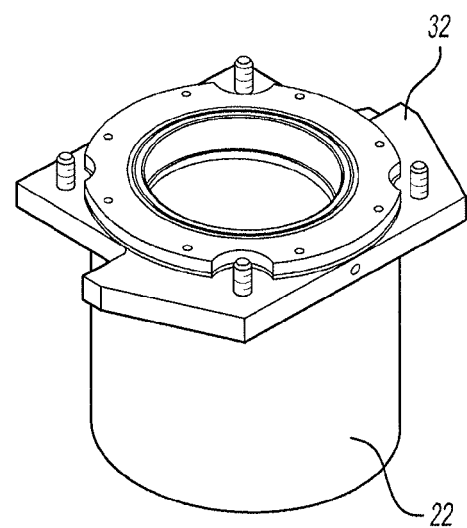
FIG. 7 schematically shows a subsequent step in the example process.

Another feature of the example elevator machine assembly 20 is that it facilitates an efficient assembly process. One example process begins by situating at least a housing of the motor portion 22 as schematically shown in FIG. 6. One of the support plates 32 is then supported on the housing of the motor portion 22 as schematically shown in FIG. 7.

Figure 8:
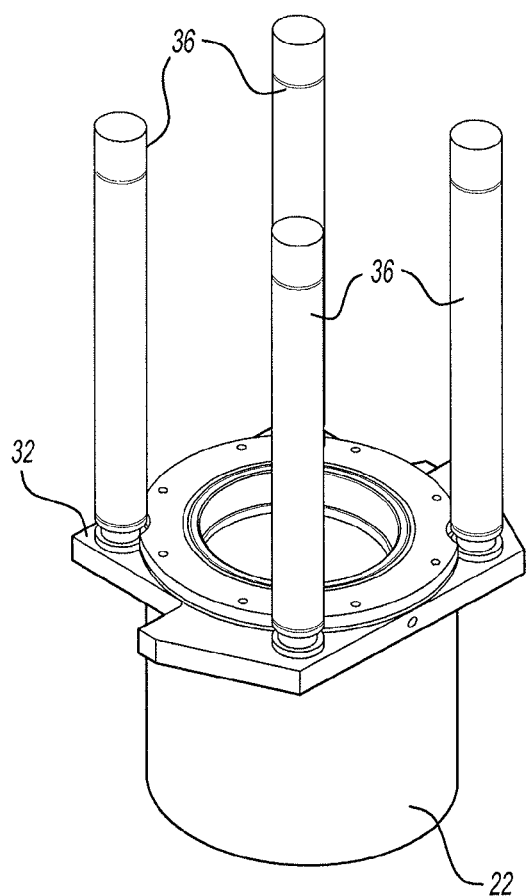
FIG. 8 schematically shows a subsequent step in the example process.
Figure 9:
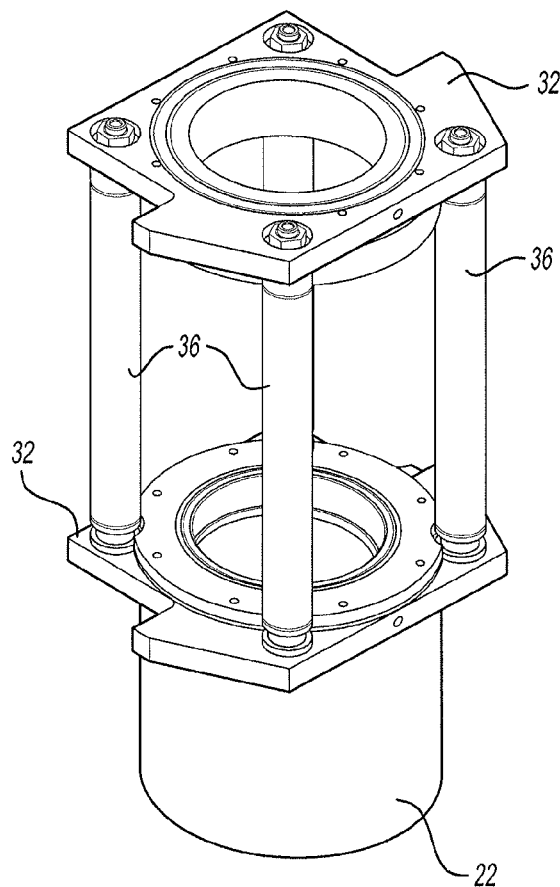
FIG. 9 schematically shows a subsequent step in the example process.
Figure 10:
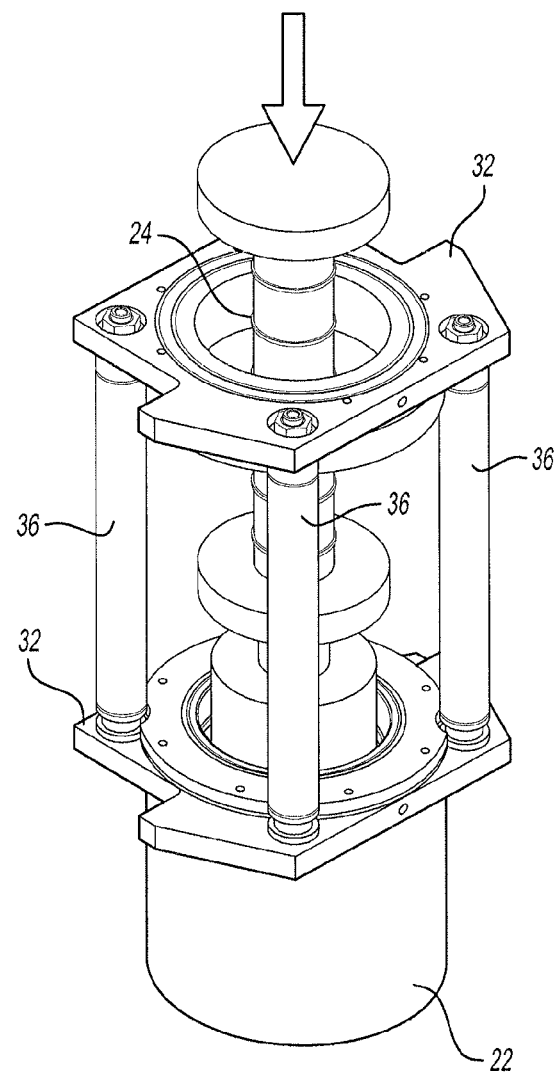
FIG. 10 schematically shows a subsequent step in the example process.

The plurality of support rods 36 are next connected with the support plate 32 as schematically shown in FIG. 8. The other support plate 32 is then connected to opposite ends of the support rods 36 as schematically shown in FIG. 9. The arrangement shown in FIG. 9 is then well situated to receive the traction sheave 24 and any associated motor components as schematically shown in FIG. 10. In this example, the traction sheave 24 and associated motor components are inserted through the inner portions 64 of the bearing housings 34, which are positioned within the openings 57 of the support plates 32.

As can be appreciated from the drawings, the example assembly process may be completed prior to shipping the assembled elevator machine assembly 20 to a location where it will be installed as part of an elevator system. Alternatively, it is possible to perform the assembly process on site at the location of the elevator system because the assembly process is relatively straight-forward.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of assembling an elevator machine frame comprising the steps of:
    situating at least a portion of a motor in a desired position;
    placing a first elevator frame support plate against the portion of the motor;
    connecting a plurality of support rods to the first elevator frame support plate;
    connecting a second elevator frame support plate to the support rods such that the first and second elevator frame support plates are spaced from each other and in a desired alignment with each other; and
    while the first and second elevator frame support plates are spaced from each other in the desired alignment, inserting a traction sheave and an associated motor component through an opening in the second support plate in a direction from the second elevator support plate toward the first elevator frame support plate and inserting at least a portion of the associated motor component through a corresponding opening in the first elevator frame support plate.

2. The method of claim 1, comprising securing a bearing housing to each of the support plates.

3. A method of assembling an elevator machine frame comprising the steps of:
    placing a first elevator frame support plate on top of a portion of a motor so that the first elevator frame support plate is supported on the portion of the motor;
    connecting a plurality of support rods to the first elevator frame support plate;
    connecting a second elevator frame support plate to the support rods such that the first elevator frame support is beneath and spaced from the second elevator frame support plate, wherein the first and second elevator frame support plates are in a desired alignment with each other;
    lowering a traction sheave and an associated motor component through an opening in the second elevator frame support plate; and
    lowering at least a portion of the associated motor component through a corresponding opening in the first elevator frame support plate.

4. The method of claim 3, comprising securing a bearing housing to each of the elevator frame support plates prior to the lowering.

5. The method of claim 4, wherein the lowering includes inserting the traction sheave and the associated motor component through the bearing housing secured to the second elevator frame support plate.

6. The method of claim 3, comprising performing the lowering when the elevator frame support plates are connected to the support rods and the elevator frame support plates are in the desired alignment.

* * * * *